June 23, 1936. J. S. SHARPE 2,045,495
TRANSMISSION MECHANISM
Original Filed Sept. 10, 1932 3 Sheets-Sheet 1

June 23, 1936.   J. S. SHARPE   2,045,495
TRANSMISSION MECHANISM
Original Filed Sept. 10, 1932   3 Sheets—Sheet 3
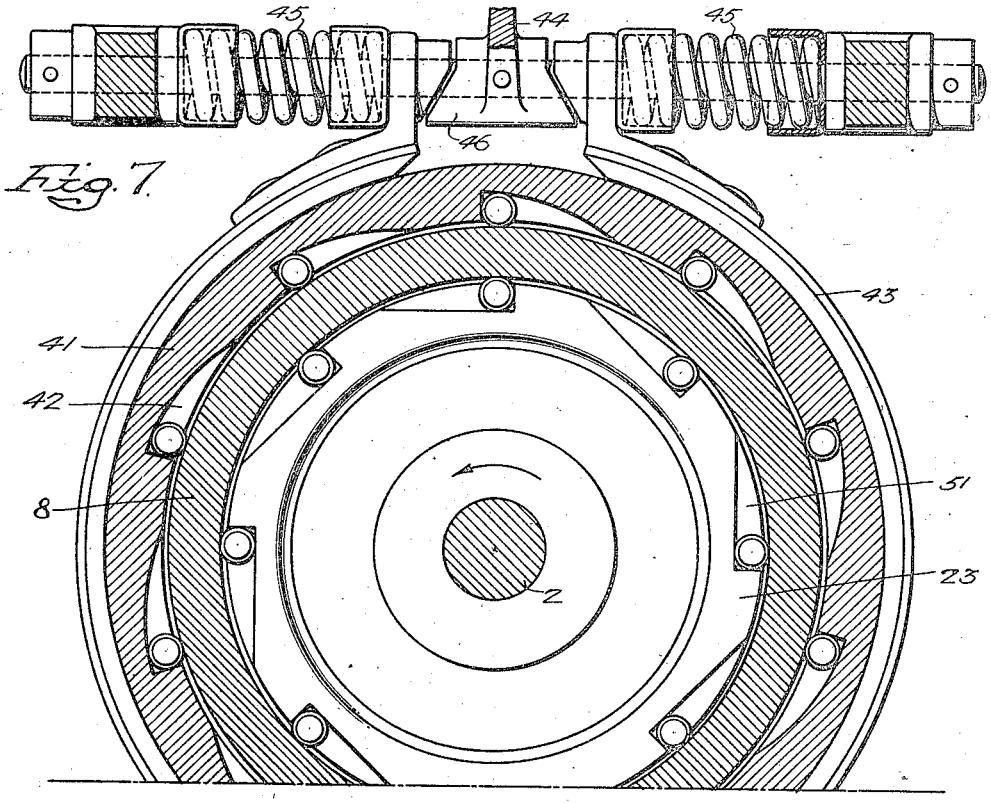
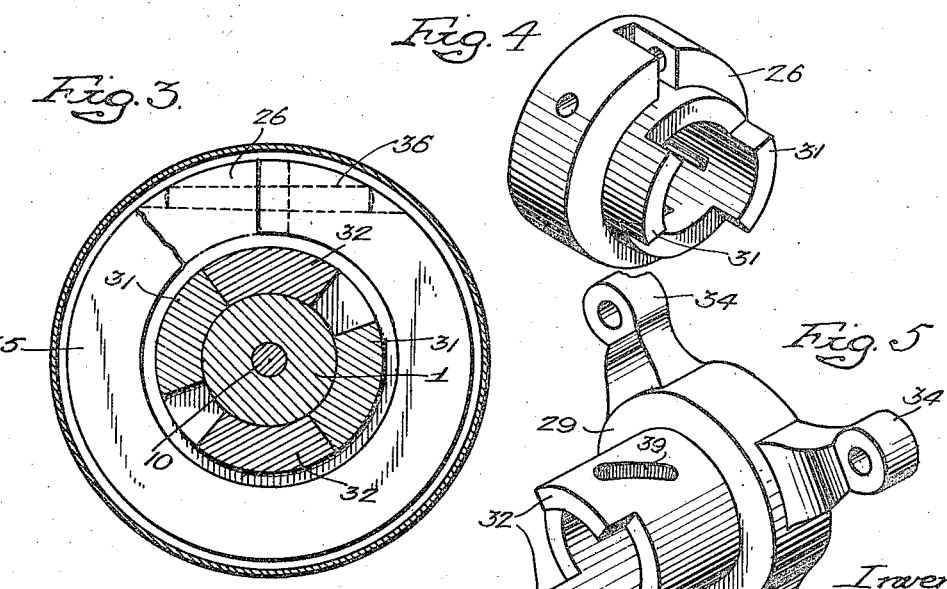
Inventor:
John S. Sharpe
by his Attorneys
Howson & Howson Patented June 23, 1936

2,045,495

UNITED STATES PATENT OFFICE 2,045,495

TRANSMISSION MECHANISM

John S. Sharpe, Haverford, Pa.

Application September 10, 1932, Serial No. 632,592
Renewed August 9, 1935

11 Claims. (Cl. 74—285)

This invention relates to improvements in transmission mechanisms of the general character of those disclosed in my copending applications Serial Numbers 440,755 and 628,721.

In the first of the aforesaid applications, I have disclosed a transmission mechanism employing planetary wheels or rollers operating in torroidal spaces between two coaxial rotary elements, provision being made for obtaining variations in speed and torque ratios of the driving and driven shafts through adjustment of the planetary rollers between the two elements which they engage and within the torroidal space to thereby relatively vary the distances of the points of contact of each of the planetary wheels with the respective elements from the joint axis of the latter.

In the second of the aforesaid applications, I have disclosed a device for obtaining an automatic adjustment of the said planetary wheels or rollers to vary the torque ratio of the driving and driven shafts controlled by the velocity of the driven shaft.

By the present invention I provide a transmission mechanism of the stated character incorporating novel means for automatically varying the torque ratios of the driving and driven shafts in accordance with the load requirements, and to this general end, the invention contemplates provision in the transmission of novel means for adjusting the planetary wheels, as set forth above, in accordance with the torque requirements, whereby when a heavy load is placed upon the driven shaft there will automatically result an adjustment of said planetary wheels affording a greater transmitted torque from the driving to the driven shaft, and vice versa.

An object of the invention, therefore, in broad terms is to provide a variable torque transmission mechanism having automatic means for varying the torque relation of the driving and driven elements in accordance with the torque requirements.

Another object of the invention is to provide a novel and highly practical device for use with variable torque transmission mechanisms for regulating the mechanism in accordance with the torque requirements.

Still another object of the invention is to provide a transmission mechanism of the character described having means providing for rapid and easy adjustment of the transmission elements from the high speed or low torque positions to the low speed high torque positions following an interruption in the operation of the mechanism while the said elements are in other than the low speed positions.

A still further object of the invention is to provide a device for preventing undue strains or misadjustments of the elements of the mechanism when momentarily the transmission of power through the mechanism is reversed from the normal direction, as hereinafter more fully described.

The invention further resides in certain mechanical and structural details and features hereinafter set forth and illustrated in the attached drawings, in which:

Fig. 3 is a section on the line 3—3, Fig. 1;

Figs. 4 and 5 are, respectively, views in perspective of coupling elements constituting elements of the mechanism;

Fig. 6 is a reduced fragmentary plan view illustrating a detail of the mechanism;

Fig. 7 is a section on the line 7—7, Fig. 1, and

Fig. 8 is a reduced fragmentary view showing a brake-operating device.

Figure 2:
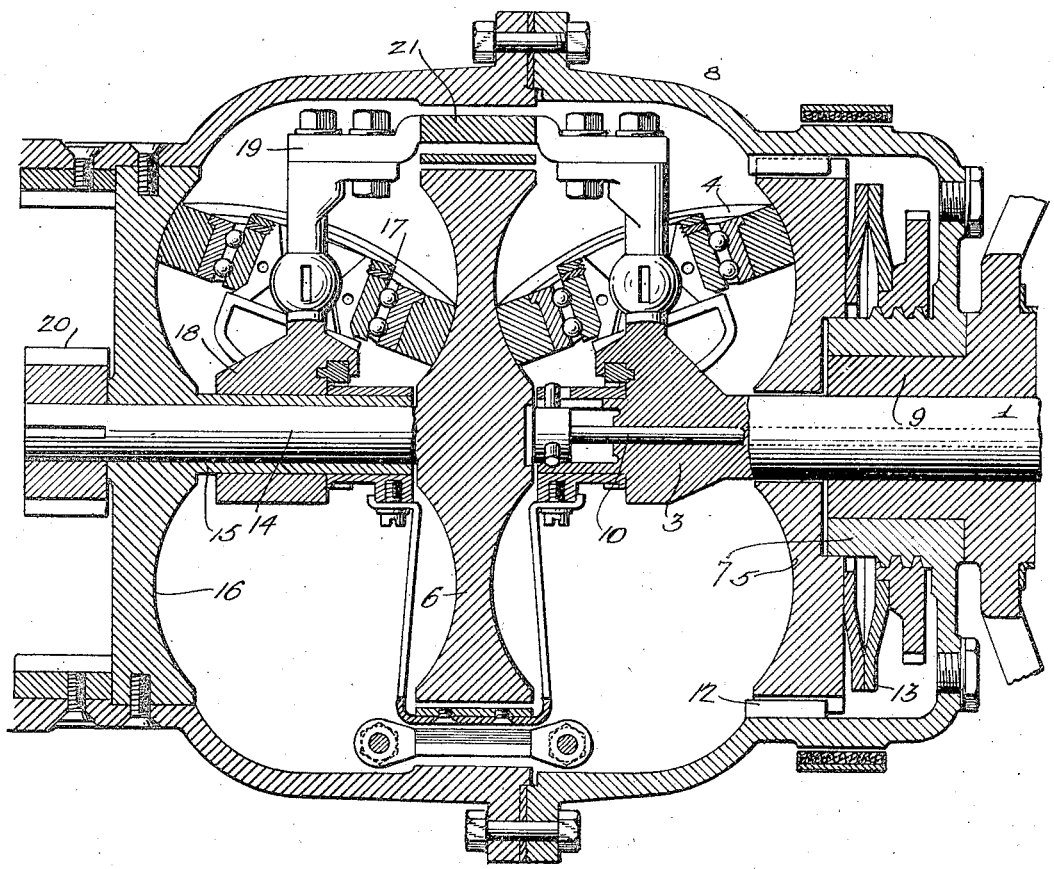
Fig. 2 is a longitudinal sectional view showing details of the mechanism not disclosed in Fig. 1.

With reference to the drawings, the mechanism may be considered as comprising a driving shaft 1 and a driven shaft 2. As shown in Fig. 2, the driving shaft 1 has at its inner end a spider 3 supporting a plurality of planetary wheels 4, one only of these wheels being illustrated. The wheels 4 operate in a torroidal space formed between elements 5 and 6, the element 5 being journaled on an inwardly projecting portion 7 of a rotary housing 8, which housing in turn is journaled in fixed bearings 9 and 11. As illustrated at 12, the member 5 is in effect splined to the housing 8 so that the said member and housing must necessarily rotate together while relative movement of these parts in the axial direction is permitted. A spring 13 bearing against the outer face of the member 5 tends to force the latter inwardly against the wheels 4 so that the latter are confined between the members 5 and 6.

The member 6 is carried by a shaft 14 which is journaled in a hub extension 15 of a member 16 secured in the housing. This member 16 with the member 6 defines a second torroidal space within which operates a second set of planetary wheels, (one only of these wheels being shown), which wheels are mounted on a spider 18 journaled on the hub extension 15 of the member 16 and connected through yokes 19 and an annulus 21, by which said yokes are connected with the spider 3 which carries the planetary wheels 4. The wheels 4 and 17 are mounted adjustably on their respective spiders so as to be adjustable in their respective torroidal spaces between the positions in which they are shown in Fig. 2 to reverse positions in which the distances of the points of contact of each of the wheels with the respective confining members from the axis of the shafts 1 and 14 are reversed. This adjustment of the wheels 4 and 17 known as "precessing" is effected in the present instance through longitudinal manipulation of a rod 10 extending axially through the shaft 1.

The shaft 14 carries a pinion 20 which meshes with planetary pinions 22 journaled on a spider 23 on the driven shaft 2. The planetary gears 22 also mesh with an annular gear 24 carried by the housing 8.

The mode of operation of the aforedescribed mechanism comprising the planetary wheels 4 and 17 and the manner in which these elements are adjusted in order to vary the torque and speed ratios of the driving and driven shafts is fully described in my aforesaid pending application Serial Number 628,721. It is sufficient for an explanation of the present invention to state that when the planetary wheels 4 and 17 are in the positions in which they are shown in Fig. 2, a low speed high torque relation prevails between the driving and driven shafts, and as the wheels are progressively adjusted from this position into the reverse position in which they incline in the opposite directions, the torque and speed relation of the driving and driven shafts approach unity, until when a position of effective balance is reached, the driving and driven shafts together with the housing and, in fact, the entire mechanism rotates as a unit in a direct drive relation between the driving and driven shafts.

Figure 1:
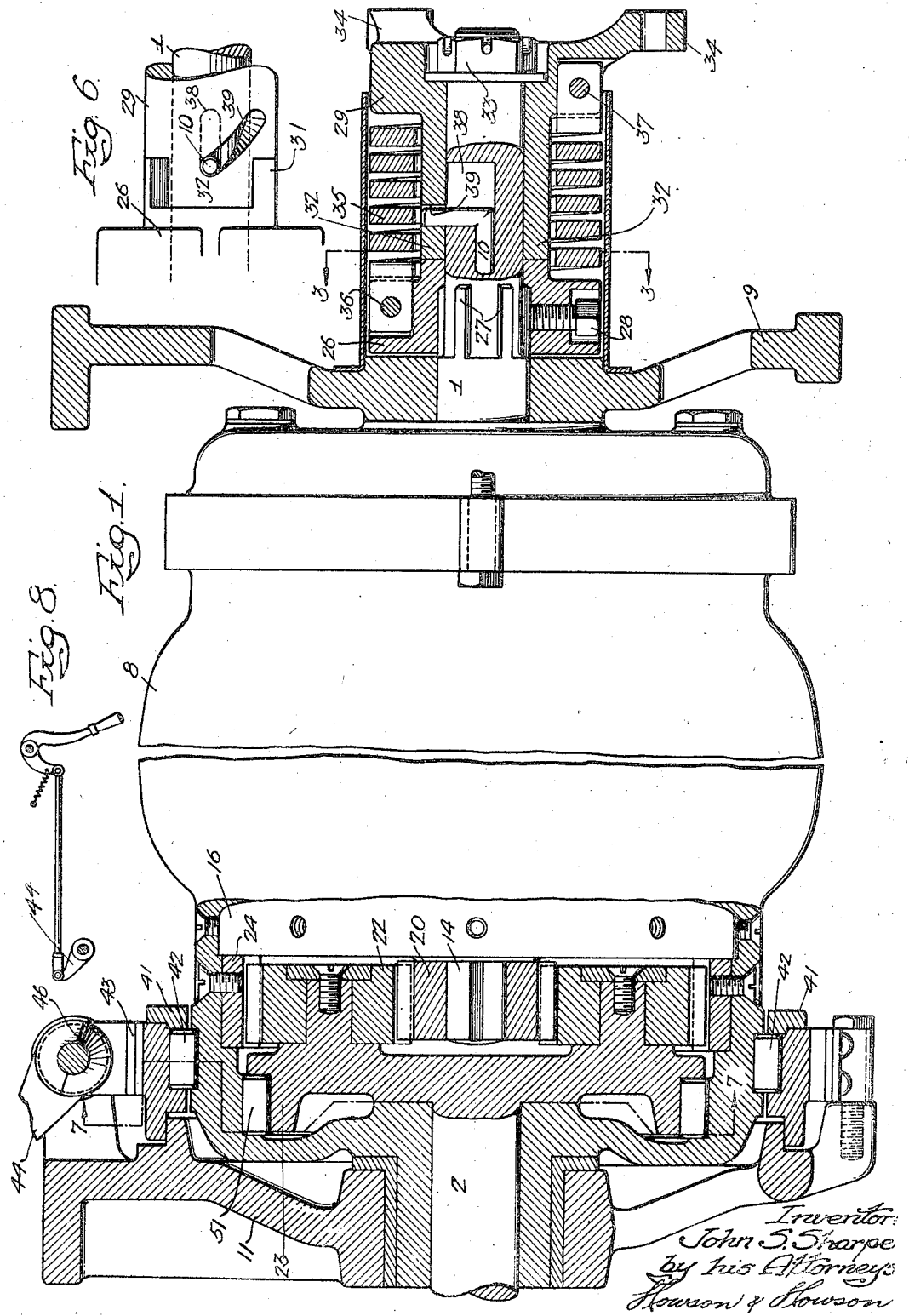
Figure 1 is a side elevational view of the transmission mechanism wherein the parts to which the present invention immediately relates are shown in section.

In accordance with the present invention, I provide the outer end of the drive shaft 1 with a coupling comprising a member 26 which is fixed to the shaft through splines 27 and a set screw 28. This coupling member is illustrated in Fig. 4 of the drawings. A second coupling member 29, see Figs. 1 and 5, is loosely mounted upon the extremity of the shaft 1 and interlocks with the member 26 through the medium of the jaws 31 of the member 26 and 32 of the member 29. As shown in Fig. 3, the jaws 31 and 32 are of such width as to permit a certain limited free rotary movement between the coupling members. The member 29 is held in position upon the shaft 1 through the medium of a nut 33 on the threaded end of the shaft, and the member is also provided, as shown in Fig. 5, with radial arms 34 through the medium of which the member 29 may be connected flexibly with the shaft of a motor or other source of power. As shown in Fig. 1, a torsion spring 35 surrounds the interlocking portions of the coupling 26—29, and this spring 35 is secured at one end to the member 26 and at the other end to the member 29, as illustrated at 36 and 37 respectively. As shown in Fig. 1, the outer extremity of the rod 10 extends radially through an axial slot 38 in the shaft 1 and into a slot 39 in the coupling member 29, see Figs. 1 and 5, the slot 39 being formed at an angle to the axis of the shaft 1. Through this inclined slot 39 the member 29 is adapted, when rotated with respect to the shaft 1, to function as a cam advancing or retracting the offset end of the rod 10 in the slot 38 and thereby longitudinally adjusting the said rod. As previously set forth, the adjustment of the rod 10 results in a precessional movement of the planetary wheels 4 and 17 and a resultant modification of the torque and speed relations of the driving and driven shafts.

Normally the spring 35 holds the coupling members 26 and 29 in the relative positions in which they are shown in Fig. 6, wherein the rod 10 occupies a position adjacent the inner end of the slot 38. This is the position of the rod which normally corresponds to the high speed and low torque adjustment of the planetary wheels 4 and 17, see Fig. 2. Assuming now that power is applied to the shaft 1 through the coupling 26—29 from a source of power, and a load applied through a clutch (not shown) to the shaft 2, if this load is sufficiently heavy to cause a contraction of the spring 35, it is apparent that the rod 10 through the cam action of the coupling member 29 as previously described will be drawn to the right, considering Fig. 1, with the result that the planetary wheels 4 and 17 will be adjusted in a direction which if the elements 5, 6 and 16 were in motion would effect a precessional movement of these planetary wheels from the high speed position, which they would normally occupy with the mechanism inoperative, toward the low speed and high torque position. The heavier the load applied to the shaft 2, the greater will be the angular movement of the coupling member 29 and the axial movement of the rod 10. When, by means hereinafter described, the wheels 4 and 17 have moved into the low speed high torque position, the increased torque ratio of the driving and driven shafts permits the source of power to move the shaft 2 against the load. As the speed of the shaft 2 increases, the load under ordinary conditions will decrease, with the result that the torque applied to the coupling member 29 will also decrease the spring 35, thus tending to readjust the coupling member 29 with respect to the member 26 towards their original positions, thereby effecting an inward movement of the rod 10 and an adjustment of the wheels 4 and 17 effecting a gradual precessional movement of these wheels toward the high speed position which they originally occupied.

Eventually the wheels 4 and 17 having moved approximately to the extreme high speed position, the entire mechanism will rotate as a unit in a condition of direct drive between the source of power and the driven shaft. If for any reason the load on the driven shaft 2 again increases, the resultant relative movement of the clutch members 26 and 29 will again result in a retraction of the rod 10 and a readjustment of the wheels 4 and 17 toward the high torque position. It is apparent, therefore, that the torque relation between the driving and driven shafts 1 and 2 and this mechanism is directly dependent upon the torque requirements or upon the load applied to the driven shaft. With this device, it is apparent that when the operation of the mechanism is interrupted, the planetary elements 4 and 17 will have a tendency to remain in the high speed low torque position, the rod 10 being in the position shown in Fig. 1.

Assuming that there is not sufficient power at the source to set the driven shaft in motion against the load while the planetary elements 4 and 17 are in the low torque position, it is apparent that provision must be made for returning these wheels to the low speed position before the mechanism can be made to operate.

Referring to Fig. 1, it will be noted that the housing 8 is surrounded by an annulus 41, and that between this annulus and the housing there is provided a one-way roller clutch indicated at 42 and best shown in Fig. 7. This clutch, reference being had to Fig. 7, permits a counterclockwise movement of the housing 8 with respect to the annulus 41, but prevents a reverse movement. Operative on the annulus 41 is a band clutch 43 fixed to the stationary portion of the mechanism and operative through a lever 44 to immobilize the annulus 41 or to release it as may be desired.

As shown in Fig. 7, the two ends of the clutch band 43 are normally held together contracting the band upon the annulus 41 by springs 45, 45, and the said ends of the brake band may be separated against the pressure of the springs 45 through a cam 46 to which the lever 44 is connected, thereby releasing the brake. Normally the brake is applied to the annulus 41 to immobilize the latter. In a mechanism of this character it is essential under normal starting conditions that the planetary rollers 4 and 17 be in the low speed high torque position and also to prevent reverse rotary movement of the housing 8. This is accomplished in the present instance as set forth above by immobilizing the annulus 41, the clutch 42 then functioning to prevent said reverse rotation of the housing. This clutch 42, however, does not prevent the normal rotation of the housing 8 which occurs when the transmission is adjusted to the normal direct or drive relation.

Assuming now that the planetary wheels 4 and 17 are in the high speed position and that greater torques are required to move the load applied to the driven shaft 2 than can be obtained from the power source in this adjustment of the wheels 4 and 17, by releasing the brake 43 and applying power through the mechanism against the load, an immediate precessional movement of the planetary wheels 4 and 17 is effected which carries these wheels from the high speed low torque position of adjustment to the low speed high torque position wherein the transmission mechanism is effective to move the load upon reapplication of the brake.

In order to prevent undue strains or adjustment of the planetary wheels 4 and 17 beyond the high speed low torque limit under conditions wherein the inertia of the load applied to the shaft 2 creates a driving force upon the shaft greater than the driving force applied to the shaft 1 from the source of power, I provide a one-way clutch mechanism between the housing 8 and the spider mechanism 23 of the driven shaft 2, this clutch mechanism being indicated at 51 in Figs. 1 and 7. It will be noted that this clutch permits, with reference to Fig. 7, a movement of the housing 8 in a clockwise direction with reference to the spider 23, but prevents the opposite or counterclockwise movement. This insures that under all circumstances the mechanism cannot exceed the one-to-one or direct drive relation between the shafts 1 and 2, which precludes any possible misadjustment of the planetary wheels 4 and 17 which might occur under the conditions previously set forth.

It will be understood that there may be other modification without departure from the invention.

I claim:

1. In transmission mechanism, the combination with driving and driven elements, of means connecting said elements and adjustable to vary the speed and torque relation thereof, means for coupling said driving element with a source of power, said coupling means comprising a sleeve loosely mounted for rotation on said shaft, means for limiting the angular movement of said sleeve on the shaft, a spring connecting said sleeve with the shaft and normally opposing said angular movement, an operating rod for said adjustable means extending longitudinally and centrally through said drive shaft and terminating in a longitudinal slot in the latter, a slot in said sleeve formed at an angle to the axis of said sleeve and registering with the slot in said shaft, and an element extending from the end of said operating rod outwardly through the said shaft slot and into the slot in said sleeve whereby a relative rotational movement of the sleeve on the shaft results in a longitudinal adjustment of said rod and a corresponding adjustment of said speed and torque-varying means.

2. In transmission mechanism, the combination with opposed rotary elements and planetary members confined between and engaging said elements, said elements and members being relatively adjustable to vary the torque and speed characteristics of said mechanism, means for automatically relatively adjusting said opposed elements and planetary members to vary the speed and torque characteristics in accordance with variations in the torque demands imposed upon the transmission, means for normally immobilizing one of said opposed elements from rotation in one direction, and means for releasing said element to permit rotation in either direction.

3. The combination with a planetary driven member, of a pair of coaxial rotary elements engaging opposite sides of said planetary member, a planetary driving member operative through one of said elements to exert a driving torque of predetermined magnitude upon said driven member and a lesser driving torque upon said driven member through the other of said elements, means for preventing rotation of the last-named element in a direction reverse to the normal direction of rotation of the driving and driven members, adjustable means for progressively decreasing and increasing said driving torques respectively to a condition of effective balance wherein the said elements and driven member tend to rotate as a unit in the same direction, means for automatically actuating said adjustable means in accordance with variations in the torque demands imposed upon the driving member, and means for releasing said immobilizing means to permit a reverse adjustment of said adjustable means to their original position of unbalance.

4. The combination with a planetary driven member, of a pair of axial rotary elements engaging opposite sides of said planetary member, a planetary driving member, means for relatively adjusting said rotary elements and driving member to vary the speed and torque characteristics of said mechanism, said elements and members in one of the said positions of relative adjustment being adapted to rotate in one direction as a unit, and means for preventing rotation of the driven member in the reverse direction and with respect to said rotary elements.

5. The combination with a planetary driven member, of a pair of coaxial rotary elements engaging opposite sides of said planetary member, a planetary driving member operative through said elements to exert a driving torque upon said driven member, means for adjusting said planetary driving member with respect to said elements to vary the speed and torque ratios of the driving and driven members, and means for automatically actuating said adjusting means in accordance with variations in the torque demands upon the driving member.

6. In transmission mechanism, the combination with opposed rotary elements and a planetary driving member confined between and engaging said elements, said elements and the driving member being relatively adjustable to vary the torque and speed characteristics of said mechanism, and means operatively associated with the driving member for automatically relatively adjusting said opposed elements and planetary driving member to vary their torque and speed relation in accordance with variations in the torque demands imposed upon the transmission.

7. The combination with a planetary driven member, of a pair of coaxial rotary elements engaging opposite sides of said planetary member, a planetary driving member operative through said elements to exert a driving torque upon said driven member, said elements and the driving and driven members being mounted for rotation as a unit in one direction, means for preventing rotation of one of the rotary elements in the reverse direction, means for adjusting the planetary driving member between said elements to progressively increase and decrease the speed and torque ratios of the driving and driven members, and means for automatically actuating said adjusting means in accordance with variations in the torque demands imposed upon the driving member.

8. The combination with planetary driving and driven members, of means including independently rotatable elements operatively connected with both of said members for transmitting opposed torques to the driven member from the driving member tending respectively to rotate the driven member in opposite directions about its axis, adjustable means for progressively relatively varying the magnitudes of said torques between a condition of substantial balance, wherein said elements and members tend to rotate as a unit in one direction, and a condition of unbalance in which the torque imposed through one of said elements substantially exceeds the torque imposed through the other, means for preventing rotation of the last-named element in a direction reverse to the normal direction of rotation of the driving and driven members, while permitting rotation of said element in the said normal direction and means for releasing said rotation-preventing means to permit adjustment of said adjustable means from the position of balance to a position of unbalance.

9. The combination with planetary driving and driven members, of means including independently rotatable elements operatively connected with both of said members for transmitting opposed torques to the driven member from the driving member tending respectively to rotate the driven member in opposite directions about its axis, adjustable means for progressively relatively varying the magnitudes of said torques between a condition of substantial balance, wherein said elements and members tend to rotate as a unit in one direction, and a condition of unbalance in which the torque imposed through one of said elements substantially exceeds the torque imposed through the other, means for preventing rotation of the last-named element in a direction reverse to the normal direction of rotation of the driving and driven members, means for automatically actuating said adjustable means in accordance with variations in the torque demands imposed upon the driving member, and means for releasing said rotation-preventing means to permit adjustment of said adjustable means from the said position of balance to a position of unbalance.

10. The combination with planetary driving and driven members, of means including independently rotatable elements each operatively connected with both of said members for transmitting opposed torques to the driven member from the driving member tending respectively to rotate the driven member in opposite directions about its axis, adjustable means for progressively relatively varying the magnitudes of said torques between a condition of substantial balance, wherein said elements and members tend to rotate as a unit in one direction, and a condition of unbalance in which the torque imposed through one of said elements substantially exceeds the torque imposed through the other, and means for preventing rotation of the driven member in a direction reverse to said unitary rotation and with respect to said rotatable elements.

11. The combination with planetary driving and driven members, of means including a pair of independently rotatable elements operatively connected with both of said members for transmitting opposed torques to the driven member from the driving member tending respectively to rotate the driven member in opposite directions about its axis, means for adjusting said planetary driving member with respect to said elements to vary the magnitudes of said torques between a condition of substantial balance, wherein said elements and members tend to rotate as a unit in one direction, and a condition of unbalance in which the torque imposed through one of said elements substantially exceeds the torque imposed through the other, means for preventing rotation of the last-named element in a direction reverse to the normal direction of rotation of the driving and driven members, and means for automatically actuating said adjusting means in accordance with variations in the torque demands upon the driving member.

JOHN S. SHARPE.